(12) United States Patent
Yang

(10) Patent No.: US 11,968,665 B2
(45) Date of Patent: Apr. 23, 2024

(54) RESOURCE CONFIGURATION METHODS AND APPARATUSES

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 425 days.

(21) Appl. No.: 17/292,705

(22) PCT Filed: Nov. 13, 2018

(86) PCT No.: PCT/CN2018/115175
§ 371 (c)(1),
(2) Date: May 10, 2021

(87) PCT Pub. No.: WO2020/097783
PCT Pub. Date: May 22, 2020

(65) Prior Publication Data
US 2021/0400653 A1    Dec. 23, 2021

(51) Int. Cl.
*H04W 72/20* (2023.01)
*H04W 76/30* (2018.01)

(52) U.S. Cl.
CPC ........... *H04W 72/20* (2023.01); *H04W 76/30* (2018.02)

(58) Field of Classification Search
CPC ..... H04W 72/20; H04W 76/30; H04W 72/23; H04W 76/14; H04W 76/11
See application file for complete search history.

(56) References Cited

U.S. PATENT DOCUMENTS 9,942,802 B2 *   4/2018  Jung .................. H04L 41/0816
10,880,675 B2 * 12/2020  Kim .......................... H04W 4/02
2017/0245248 A1  8/2017  Lei et al.
(Continued)

FOREIGN PATENT DOCUMENTS

CN    101873667 A    10/2010
CN    104410975 A     3/2015
(Continued)

OTHER PUBLICATIONS

International Search Report issued in PCT Application No. PCT/CN2018/115175 dated Aug. 12, 2019 with English translation, (4p).
(Continued)

*Primary Examiner* — Julio R Perez
(74) *Attorney, Agent, or Firm* — Arch & Lake LLP

(57) ABSTRACT

The present disclosure provides a resource configuration method and an apparatus. The method is applied to a base station, including: setting radio resource configuration information used for sidelink communication for a terminal; when determining that it is required to transmit a connection release message to the terminal, adding the radio resource configuration information to the connection release message; and transmitting the connection release message to the terminal, so that the terminal acquires the radio resource configuration information from the connection release message and performs sidelink communication according to the radio resource configuration information.

15 Claims, 6 Drawing Sheets

---

510 — Determine, according to the valid area indication information, the valid area where the radio resource configuration information is applied 520 — Perform sidelink communication according to the radio resource configuration information in the valid area where the radio resource configuration information is applied

(56) References Cited

U.S. PATENT DOCUMENTS

| | | | |
|---|---|---|---|
| 2018/0084465 A1 | 3/2018 | Jung et al. | |
| 2018/0092155 A1* | 3/2018 | Hong et al. | |
| 2019/0037622 A1* | 1/2019 | Blasco Serrano | H04W 72/23 |
| 2019/0254107 A1* | 8/2019 | Stattin | H04W 76/34 |
| 2020/0045674 A1* | 2/2020 | Tseng | H04W 76/14 |
| 2021/0400653 A1* | 12/2021 | Yang | H04W 72/23 |
| 2023/0224783 A1* | 7/2023 | Jiang | H04W 36/0085 455/436 |

FOREIGN PATENT DOCUMENTS

| | | |
|---|---|---|
| CN | 106162930 A | 11/2016 |
| CN | 108521890 A | 9/2018 |

OTHER PUBLICATIONS

State Intellectual Property Office of the People's Republic of China, Office Action and Search Report Issued in Application No. 201880002538.2, May 21, 2021, (16p). (Submitted with Machine/Partial Translation).

ISA State Intellectual Property Office of the People's Republic of China, Written Opinion of the International Searching Authority Issued in Application No. PCT/CN2018/115175, Aug. 12, 2019, WIPO, (9p).

\* cited by examiner

RESOURCE CONFIGURATION METHODS AND APPARATUSES

CROSS REFERENCE TO RELATED APPLICATIONS

This application is the national phase application of International Application No. PCT/CN2018/115175, filed on Nov. 13, 2018, the entire content of which is incorporated herein by reference for all purposes.

TECHNICAL FIELD

The present disclosure relates to the field of communication technology, and in particular to resource configuration methods and apparatuses.

BACKGROUND

With continuous development of communication technology, and in order to support direct communication between a terminal (or user equipment, UE) and another terminal, a side link (sidelink) communication method is introduced. Sometimes, a sidelink radio resource is configured based on a resource pool, and a cell may broadcast a resource pool configuration of the cell through system information. In this way, a terminal in an idle state can obtain required sidelink radio resource by reading the system information. However, in New Radio (NR), that is, a new generation communication system, in addition to a connected state and the idle state, an inactive state is also introduced. In the inactive state, since NR connection between a UE and a base station is interrupted, the UE fails to obtain the required sidelink radio resource through the system information in the inactive state, and communication quality of the sidelink communication cannot be guaranteed.

SUMMARY

The embodiments of the present disclosure provide resource configuration methods and apparatuses.

According to a first aspect of the embodiments of the present disclosure, a resource configuration method is provided, the method is applied to a base station, including:

setting radio resource configuration information used for sidelink communication for a terminal;

when determining that it is required to transmit a connection release message to the terminal, adding the radio resource configuration information to the connection release message; and transmitting the connection release message to the terminal, so that the terminal acquires the radio resource configuration information from the connection release message and performs sidelink communication according to the radio resource configuration information.

In some embodiments, the radio resource configuration information includes at least one of first configuration information or second configuration information, the first configuration information is used to represent configuration information corresponding to a transmitting resource pool configured by the base station for the terminal, and the second configuration information is used to represent configuration information corresponding to a receiving resource pool configured by the base station for the terminal.

In some embodiments, the first configuration information includes at least one of a first time range of the transmitting resource pool or a first frequency range of the transmitting resource pool; and the second configuration information includes at least one of a second time range of the receiving resource pool or a second frequency range of the receiving resource pool.

In some embodiments, the radio resource configuration information includes third configuration information, and the third configuration information is used to represent configuration information shared by a transmitting resource pool and a receiving resource pool configured by the base station for the terminal.

In some embodiments, the third configuration information includes at least one of a third time range or a third frequency range shared by the transmitting resource pool and the receiving resource pool.

In some embodiments, transmitting the connection release message to the terminal includes:

configuring, for the terminal, a valid area where the radio resource configuration information is applied;

generating valid area indication information for indicating the valid area;

adding the valid area indication information to the connection release message; and transmitting the connection release message to the terminal, so that the terminal acquires the radio resource configuration information from the connection release message, and determines, according to the valid area indication information in the connection release message, the valid area where the radio resource configuration information is applied.

In some embodiments, the valid area indication information includes at least one of:

a cell identifier list which includes one or more designated cell identifiers;

an area identifier list which includes one or more designated area identifiers; and a Radio Access Network (RAN) area identifier list which includes one or more designated RAN area identifiers.

In some embodiments, the connection release message includes a radio resource control (RRC) connection release message.

According to a second aspect of the embodiments of the present disclosure, a resource configuration method is provided, the method is applied to a terminal, including:

receiving a connection release message transmitted by a base station, where the connection release message includes radio resource configuration information used for sidelink communication set by the base station for the terminal;

acquiring the radio resource configuration information from the connection release message; and performing sidelink communication according to the radio resource configuration information.

In some embodiments, the radio resource configuration information includes at least one of first configuration information or second configuration information, the first configuration information is used to represent configuration information corresponding to a transmitting resource pool configured by the base station for the terminal, and the second configuration information is used to represent configuration information corresponding to a receiving resource pool configured by the base station for the terminal.

In some embodiments, the first configuration information includes at least one of a first time range of the transmitting resource pool or a first frequency range of the transmitting resource pool; and the second configuration information includes at least one of a second time range of the receiving resource pool or a second frequency range of the receiving resource pool;

performing sidelink communication according to the radio resource configuration information includes at least one of:

transmitting a sidelink service in at least one of the first time range or the first frequency range; or receiving a sidelink service in at least one of the second time range or the second frequency range.

In some embodiments, the radio resource configuration information includes third configuration information, and the third configuration information is used to represent configuration information shared by a transmitting resource pool and a receiving resource pool configured by the base station for the terminal.

In some embodiments, the third configuration information includes at least one of a third time range or a third frequency range shared by the transmitting resource pool and the receiving resource pool; and performing sidelink communication according to the radio resource configuration information includes at least one of:

transmitting a sidelink service in at least one of the third time range or the third frequency range, or receiving a sidelink service in at least one of the third time range or the third frequency range.

In some embodiments, the connection release message further includes valid area indication information, and the valid area indication information is used to indicate a valid area where the radio resource configuration information is applied;

In some embodiments, performing sidelink communication according to the radio resource configuration information includes:

determining, according to the valid area indication information, the valid area where the radio resource configuration information is applied; and performing sidelink communication in the valid area according to the radio resource configuration information.

In some embodiments, the valid area indication information includes at least one of:

a cell identifier list which includes one or more designated cell identifiers;

an area identifier list which includes one or more designated area identifiers; and a Radio Access Network (RAN) area identifier list which includes one or more designated RAN area identifiers;

determining, according to the valid area indication information, the valid area where the radio resource configuration information is applied, includes:

in response to that the valid area indication information includes the cell identifier list, determining a corresponding designated cell according to the one or more designated cell identifiers, as the valid area;

in response to that the valid area indication information includes the area identifier list, determining a corresponding designated area according to the one or more designated area identifiers, and determining each cell in the designated area as the valid area;

in response to that the valid area indication information includes the RAN area identifier list, determining a corresponding designated RAN area according to the one or more designated RAN area identifiers, and determining each cell in the designated RAN area as the valid area;

performing sidelink communication in the valid area according to the radio resource configuration information includes at least one of:

transmitting a sidelink service in the valid area according to the radio resource configuration information, or receiving a sidelink service in the valid area according to the radio resource configuration information.

According to a third aspect of the embodiments of the present disclosure, a resource configuration apparatus is provided, the method is applied to a base station, including:

a setting module, configured to set radio resource configuration information used for sidelink communication for a terminal;

an adding module, configured to, when determining that it is required to transmit a connection release message to the terminal, add the radio resource configuration information to the connection release message; and a transmitting module, configured to transmit the connection release message to the terminal, so that the terminal acquires the radio resource configuration information from the connection release message and performs sidelink communication according to the radio resource configuration information.

In some embodiments, the radio resource configuration information includes at least one of first configuration information or second configuration information, the first configuration information is used to represent configuration information corresponding to a transmitting resource pool configured by the base station for the terminal, and the second configuration information is used to represent configuration information corresponding to a receiving resource pool configured by the base station for the terminal.

In some embodiments, the first configuration information includes at least one of a first time range of the transmitting resource pool or a first frequency range of the transmitting resource pool; and the second configuration information includes at least one of a second time range of the receiving resource pool or a second frequency range of the receiving resource pool.

In some embodiments, the radio resource configuration information includes third configuration information, and the third configuration information is used to represent configuration information shared by a transmitting resource pool and a receiving resource pool configured by the base station for the terminal.

In some embodiments, the third configuration information includes at least one of a third time range or a third frequency range shared by the transmitting resource pool and the receiving resource pool.

In some embodiments, the transmitting module includes:

a configuration submodule, configured to configure, for the terminal, a valid area where the radio resource configuration information is applied;

a generation submodule, configured to generate valid area indication information for indicating the valid area;

an adding submodule, configured to add the valid area indication information to the connection release message; and a transmitting submodule, configured to transmit the connection release message to the terminal, so that the terminal acquires the radio resource configuration information from the connection release message, and determines, according to the valid area indication information in the connection release message, the valid area where the radio resource configuration information is applied.

In some embodiments, the valid area indication information includes at least one of:
a cell identifier list which includes one or more designated cell identifiers;
an area identifier list which includes one or more designated area identifiers; and
a Radio Access Network (RAN) area identifier list which includes one or more designated RAN area identifiers.

In some embodiments, the connection release message includes a radio resource control (RRC) connection release message.

According to a fourth aspect of the embodiments of the present disclosure, a resource configuration apparatus is provided, the apparatus is applied to a terminal, including:
a receiving module, configured to receive a connection release message transmitted by a base station, where the connection release message includes radio resource configuration information used for sidelink communication set by the base station for the terminal;
an acquisition module, configured to acquire the radio resource configuration information from the connection release message; and
a sidelink communication module, configured to perform sidelink communication according to the radio resource configuration information.

In some embodiments, the radio resource configuration information includes at least one of first configuration information or second configuration information, the first configuration information is used to represent configuration information corresponding to a transmitting resource pool configured by the base station for the terminal, and the second configuration information is used to represent configuration information corresponding to a receiving resource pool configured by the base station for the terminal.

In some embodiments, the first configuration information includes at least one of a first time range of the transmitting resource pool or a first frequency range of the transmitting resource pool; and the second configuration information includes at least one of a second time range or a second frequency range of the receiving resource pool; the sidelink communication module includes at least one of:
a first sidelink communication submodule, configured to transmit a sidelink service in at least one of the first time range or the first frequency range; or
a second sidelink communication submodule, configured to receive a sidelink service in at least one of the second time range or the second frequency range.

In some embodiments, the radio resource configuration information includes third configuration information, and the third configuration information is used to represent configuration information shared by a transmitting resource pool and a receiving resource pool configured by the base station for the terminal.

In some embodiments, the third configuration information includes at least one of a third time range or a third frequency range shared by the transmitting resource pool and the receiving resource pool; and
the sidelink communication module includes:
a third sidelink communication submodule, configured to perform at least one of transmitting a sidelink service in at least one of the third time range or the third frequency range, or receiving a sidelink service in at least one of the third time range or the third frequency range.

In some embodiments, the connection release message further includes valid area indication information, and the valid area indication information is used to indicate a valid area where the radio resource configuration information is applied;
the sidelink communication module includes:
a first determination submodule, configured to determine, according to the valid area indication information, the valid area where the radio resource configuration information is applied; and
a fourth sidelink communication submodule, configured to perform sidelink communication in the valid area according to the radio resource configuration information.

In some embodiments, the valid area indication information includes at least one of:
a cell identifier list which includes one or more designated cell identifiers;
an area identifier list which includes one or more designated area identifiers; and
a Radio Access Network (RAN) area identifier list which includes one or more designated RAN area identifiers;
the first determination submodule includes:
a second determination submodule, configured to, in response to that the valid area indication information includes the cell identifier list, determine a corresponding designated cell according to the one or more designated cell identifiers, as the valid area;
a third determination submodule, configured to, in response to that the valid area indication information includes the area identifier list, determine a corresponding designated area according to the one or more designated area identifiers, and determine each cell in the designated area as the valid area;
a fourth determination submodule, configured to, in response to that the valid area indication information includes the RAN area identifier list, determine a corresponding designated RAN area according to the one or more designated RAN area identifiers, and determine each cell in the designated RAN area as the valid area;
the fourth sidelink communication submodule includes:
a fifth sidelink communication submodule, configured to perform at least one of transmitting a sidelink service in the valid area according to the radio resource configuration information or receiving a sidelink service in the valid area according to the radio resource configuration information.

According to a fifth aspect of the embodiments of the present disclosure, a non-transitory computer readable storage medium storing computer programs is provided, where the computer programs are used to perform the resource configuration method according to the first aspect.

According to a sixth aspect of the embodiments of the present disclosure, a non-transitory computer readable storage medium storing computer programs, where the computer programs are used to perform the resource configuration method according to the second aspect.

According to a seventh aspect of the embodiments of the present disclosure, a resource configuration apparatus is provided, the apparatus is applied to a base station, including:
a processor; and
a memory storing instructions executable by the processor,
where the processor is configured to:
set radio resource configuration information used for sidelink communication for a terminal;

when determining that it is required to transmit a connection release message to the terminal, add the radio resource configuration information to the connection release message; and transmit the connection release message to the terminal, so that the terminal acquires the radio resource configuration information from the connection release message and performs sidelink communication according to the radio resource configuration information.

According to an eighth aspect of the embodiments of the present disclosure, a resource configuration apparatus is provided, the apparatus is applied to a terminal, including:

a processor; and a memory storing instructions executable by the processor, where the processor is configured to:

receive a connection release message transmitted by a base station, where the connection release message includes radio resource configuration information used for sidelink communication set by the base station for the terminal;

acquire the radio resource configuration information from the connection release message; and perform sidelink communication according to the radio resource configuration information.

The technical solutions provided by the embodiments of the present disclosure may include the following beneficial effects.

The base station in the present disclose may set, for a terminal, radio resource configuration information used for sidelink communication. When determining that it is required to transmit a connection release message to the terminal, the base station may add the radio resource configuration information to the connection release message, and transmit the connection release message to the terminal. Thus, the terminal may acquire the radio resource configuration information from the connection release message, and perform sidelink communication according to the radio resource configuration information. In this way, the situation that the terminal fails to obtain required sidelink radio resource through system information in an inactive state is avoided, and the reliability of the sidelink communication of the terminal in an idle state and the inactive state is improved.

The terminal in the present disclose may receive a connection release message transmitted by a base station, where the connection release message includes radio resource configuration information used for sidelink communication set by the base station for a terminal. The terminal may acquire the radio resource configuration information used for sidelink communication from the connection release message and perform sidelink communication according to the radio resource configuration information. In this way, the situation that the terminal fails to obtain required sidelink radio resource through system information in an inactive state is avoided, and the reliability of the sidelink communication of the terminal in an idle state and the inactive state is improved.

It should be understood that the above general description and the following detailed description are only exemplary and explanatory, and cannot limit the present disclosure.

BRIEF DESCRIPTION OF THE DRAWINGS

The accompanying drawings, which are incorporated in and constitute a part of the present description, illustrate examples consistent with the present disclosure and serve to explain the principles of the present disclosure together with the description.

DETAILED DESCRIPTION OF THE EMBODIMENTS

Figure 1:
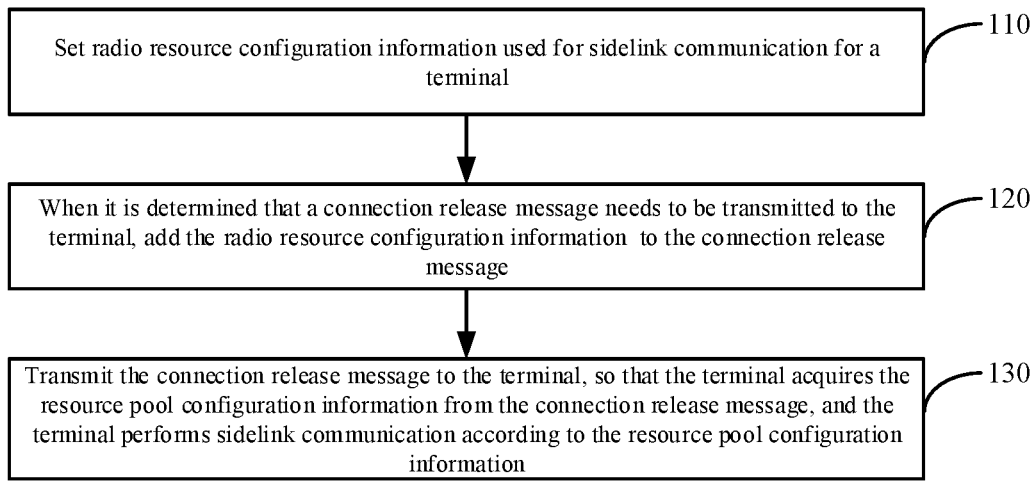
FIG. 1 is a flowchart illustrating a resource configuration method according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure.

The terms used in the present disclosure are only for the purpose of describing specific examples and are not intended to limit the present disclosure. The singular forms "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms "first", "second", "third", etc. may be used in this disclosure to describe various information, the information should not be limited to these terms. These terms are only used to distinguish information of the same type from each other. For example, without departing from the scope of the present disclosure, the first information may also be referred to as second information, and similarly, the second information may also be referred to as first information. Depending on the context, the word "if" as used herein may be interpreted as "on the condition that" or "when" or "in response to determining".

Figure 2:
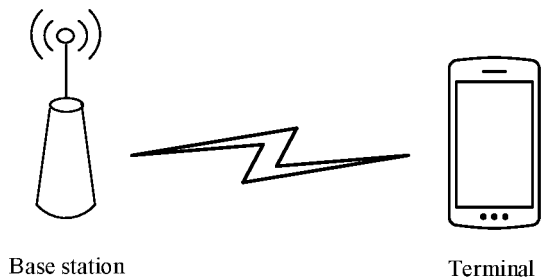
FIG. 2 is a diagram illustrating an application scenario of a resource configuration method according to an example.

FIG. 1 is a flowchart illustrating a resource configuration method according to an example; and FIG. 2 is a diagram illustrating an application scenario of a resource configuration method according to an example; the resource configuration method may be applied to a base station. As shown in FIG. 1, the resource configuration method may include following steps 110 to 130.

At step 110, radio resource configuration information used for sidelink communication is set for a terminal (or user equipment, UE).

In the examples of the present disclosure, radio resource configuration information may be configured based on a sidelink resource pool. The sidelink resource pool may be divided into a transmitting resource pool and/or a receiving resource pool.

In an example, the radio resource configuration information at step 110 may include first configuration information and/or second configuration information. The first configuration information is used to represent configuration information corresponding to the transmitting resource pool configured by the base station for the terminal. The second configuration information is used to represent configuration information corresponding to the receiving resource pool configured by the base station for the terminal.

In an example, the first configuration information may include a first time range and/or a first frequency range of the transmitting resource pool; the second configuration information may include a second time range and/or a second frequency range of the receiving resource pool. The first configuration information is used to indicate that the terminal transmits a sidelink service in the first time range and/or the first frequency range. The second configuration information is used to indicate that the terminal receives the sidelink service in the second time range and/or the second frequency range.

In an example, the radio resource configuration information at step 110 may include third configuration information. The third configuration information is used to represent configuration information shared by a transmitting resource pool and a receiving resource pool configured by the base station for the terminal.

In an example, the third configuration information includes a third time range and/or a third frequency range shared by the transmitting resource pool and the receiving resource pool. The third configuration information is used to indicate that the terminal transmits and/or receives a sidelink service in a third time range and/or a third frequency range.

At step 120, when it is determined that a connection release message needs to be transmitted to the terminal, the radio resource configuration information is added to the connection release message.

In the examples of the present disclosure, a base station may notify a terminal of radio resource configuration information through a connection release message. The base station decides when to transmit the connection release message according to an actual situation. For example, for power saving, the base station may decide to actively release the terminal, and actively releasing the terminal is achieved by transmitting the connection release message to the terminal.

Correspondingly, after receiving the connection release message, the terminal enters an idle state or an inactive state according to the indication of the connection release message, acquire the radio resource configuration information used for sidelink communication from the connection release message, and perform sidelink communication according to the radio resource configuration information.

In an example, the connection release message at step 120 may include, but is not limited to, a Radio Resource Control (RRC) connection release message.

At step 130, the connection release message is transmitted to the terminal, so that the terminal acquires the radio resource configuration information from the connection release message, and the terminal performs sidelink communication according to the radio resource configuration information.

In an example scenario, as shown in FIG. 2, a base station and a terminal are included. The base station may set radio resource configuration information used for sidelink communication for the terminal. When it is determined that a connection release message needs to be transmitted to the terminal, the radio resource configuration information may be added to the connection release message, and the connection release message may be transmitted to the terminal. In this way, the terminal can acquire the radio resource configuration information from the connection release message, and perform sidelink communication according to the radio resource configuration information.

It can be seen from the above examples that radio resource configuration information used for sidelink communication may be set for a terminal. When it is determined that a connection release message needs to be transmitted to the terminal, the radio resource configuration information is added to the connection release message, and the connection release message is transmitted to the terminal. Thus, the terminal may acquire the radio resource configuration information from the connection release message, and perform sidelink communication according to the radio resource configuration information. In this way, the situation that the terminal fails to obtain required sidelink radio resource through system information in an inactive state is avoided, and the reliability of the sidelink communication of the terminal in an idle state and the inactive state is improved.

Figure 3:
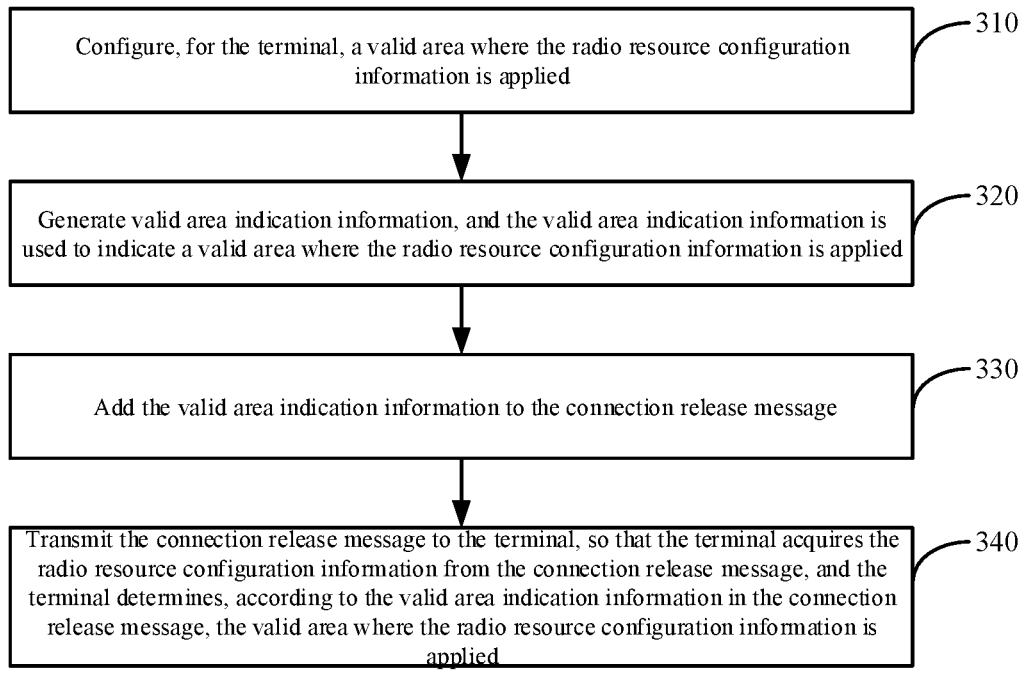
FIG. 3 is a flowchart illustrating another resource configuration method according to an example.

FIG. 3 is a flowchart illustrating another resource configuration method according to an example. The resource configuration method may be applied to a base station and is on the basis of the method shown in FIG. 1. When step 130 is performed, as shown in FIG. 3, the following steps 310-340 may be included.

At step 310, a valid area where the radio resource configuration information is applied is configured for the terminal.

In the examples of the present disclosure, after a base station sets radio resource configuration information used for sidelink communication for a terminal, it is also required to configure, for the terminal, a valid area where the radio resource configuration information is applied. For example, the valid area may be one or more cells.

At step 320, valid area indication information is generated, and the valid area indication information is used to indicate a valid area where the radio resource configuration information is applied.

In the examples of the present disclosure, after the base station configures the valid area, it can inform the terminal of a specific range of the valid area through valid area indication information.

In an example, the valid area indication information at step 320 may represent an actual range of the valid area in the form of a list, which includes, but is not limited to, at least one of:
(1-1) a cell identifier list which includes one or more designated cell identifiers;
(1-2) an area identifier list which includes one or more designated area identifiers; and (1-3) a Radio Access Network (RAN) area identifier list which includes one or more designated RAN area identifiers.

A designated cell corresponding to the one or more designated cell identifiers in (1-1) above is a valid area where radio resource configuration information is applied. In other words, when a terminal moves in designated cells, it can use the same radio resource configuration information.

Each cell in a designated area corresponding to the one or more designated area identifiers in (1-2) above is a valid area where the radio resource configuration information is applied. The area identifier is introduced in New Radio (NR), that is, a new generation communication system, and is used to indicate the actual range of the corresponding area. Correspondingly, after the terminal acquires the radio resource configuration information from the connection release message, for cells identified in the same area, the radio resource configuration information is not required to be re-acquired, and the previously acquired radio resource configuration information is still valid.

Each cell in a designated RAN area corresponding to the designated RAN area identifier in (1-3) above is a valid area where radio resource configuration information is applied. The RAN area identifier is introduced in New Radio (NR), that is, a new generation communication system, and is used to indicate the actual range of the corresponding RAN area. Correspondingly, when the terminal is in the inactive state, its NR connection with the base station is interrupted, but it can also reselect a cell in the RAN area without reporting to a network. Meanwhile, when the terminal moves in the RAN area, the same radio resource configuration information can be used to transmit and/or receive a sidelink service.

At step 330, the valid area indication information is added to the connection release message.

In the examples of the present disclosure, valid area indication information configured by a base station for a terminal may also be notified to the terminal through a connection release message (for example, an RRC connection release message).

At step 340, the connection release message is transmitted to the terminal, so that the terminal acquires the radio resource configuration information from the connection release message, and the terminal determines, according to the valid area indication information in the connection release message, the valid area where the radio resource configuration information is applied.

It can be seen from the above examples that a valid area where radio resource configuration information is applied may be configured for a terminal, valid area indication information may be generated, the valid area indication information is added to a connection release message, and the connection release message is transmitted to the terminal. In this way, the terminal may acquire the radio resource configuration information from the connection release message, and determine, according to the valid area indication information in the connection release message, the valid area where the radio resource configuration information is applied, thereby improving the accuracy and efficiency of sidelink communication.

Figure 4:
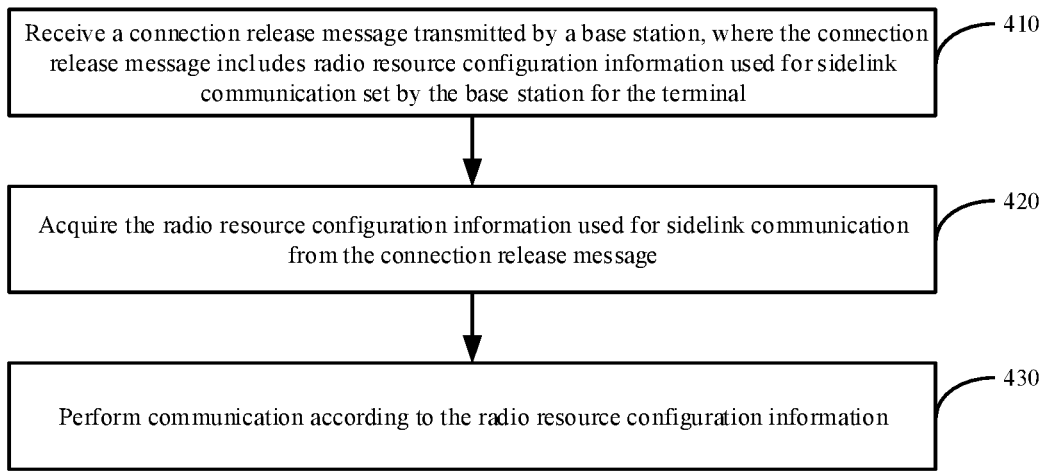
FIG. 4 is a flowchart illustrating a resource configuration method according to an example.

FIG. 4 is a flowchart illustrating a resource configuration method according to an example. The resource configuration method may be applied to a terminal. As shown in FIG. 1, the resource configuration method may include following steps 410 to 430.

At step 410, a connection release message transmitted by a base station is received, where the connection release message includes radio resource configuration information used for sidelink communication set by the base station for the terminal.

In the examples of the present disclosure, radio resource configuration information may be configured based on a sidelink resource pool. The sidelink resource pool may be divided into a transmitting resource pool and/or a receiving resource pool.

In an example, the radio resource configuration information at step 410 may include first configuration information and/or second configuration information. The first configuration information is used to represent configuration information corresponding to the transmitting resource pool configured by the base station for the terminal. The second configuration information is used to represent configuration information corresponding to the receiving resource pool configured by the base station for the terminal.

In an example, the first configuration information may include a first time range and/or a first frequency range of the transmitting resource pool; the second configuration information may include a second time range and/or a second frequency range of the receiving resource pool. The first configuration information is used to indicate that the terminal transmits a sidelink service in the first time range and/or the first frequency range. The second configuration information is used to indicate that the terminal receives the sidelink service in the second time range and/or the second frequency range.

In an example, the radio resource configuration information at step 410 may include third configuration information. The third configuration information is used to represent configuration information shared by a transmitting resource pool and a receiving resource pool configured by the base station for the terminal.

In an example, the third configuration information includes a third time range and/or a third frequency range shared by the transmitting resource pool and the receiving resource pool. The third configuration information is used to indicate that the terminal transmits and/or receives a sidelink service in a third time range and/or a third frequency range.

At step 420, the radio resource configuration information used for sidelink communication is acquired from the connection release message.

In the examples of the present disclosure, since a base station may notify a terminal of radio resource configuration information through a connection release message, the terminal may acquire the radio resource configuration information used for sidelink communication from the connection release message directly.

At step 430, sidelink communication is performed according to the radio resource configuration information.

In the examples of the present disclosure, if the radio resource configuration information includes first configuration information and/or second configuration information, where the first configuration information is used to represent configuration information corresponding to a transmitting resource pool configured by the base station for the terminal and the second configuration information is used to represent configuration information corresponding to a receiving resource pool configured by the base station for the terminal, the terminal may perform sidelink communication according to the first configuration information and/or the second configuration information; if the radio resource configuration information includes third configuration information, where the third configuration information is used to represent configuration information shared by a transmitting resource pool and a receiving resource pool configured by the base station for the terminal, the terminal may perform sidelink communication according to the third configuration information.

In an example, if the first configuration information may include a first time range and/or a first frequency range of the transmitting resource pool; the second configuration information may include a second time range and/or a second frequency range of the receiving resource pool; since the first configuration information is used to indicate that the terminal transmits a sidelink service in the first time range and/or the first frequency range; the second configuration information is used to indicate that the terminal receives the sidelink service in the second time range and/or the second frequency range, step 430, when performed by the terminal, may include:

(2-1) transmitting a sidelink service in the first time range and/or the first frequency range; and/or
(2-2) receiving a sidelink service in the second time range and/or the second frequency range.

In an example, if the third configuration information includes a third time range and/or a third frequency range shared by the transmitting resource pool and the receiving resource pool, since the third configuration information is used to indicate that the terminal transmits and/or receives a sidelink service in the third time range and/or the third frequency range, step 430, when performed by the terminal, may include:

(3-1) transmitting and/or receiving a sidelink service in the third time range and/or the third frequency range.

It can be seen from the above examples that a connection release message transmitted by a base station is received, where the connection release message includes radio resource configuration information used for sidelink communication set by the base station for a terminal. The radio resource configuration information used for sidelink communication is acquired from the connection release message and sidelink communication is performed according to the radio resource configuration information. In this way, the situation that the terminal fails to obtain required sidelink radio resource through system information in an inactive state is avoided, and the reliability of the sidelink communication of the terminal in an idle state and the inactive state is improved.

Figure 5:
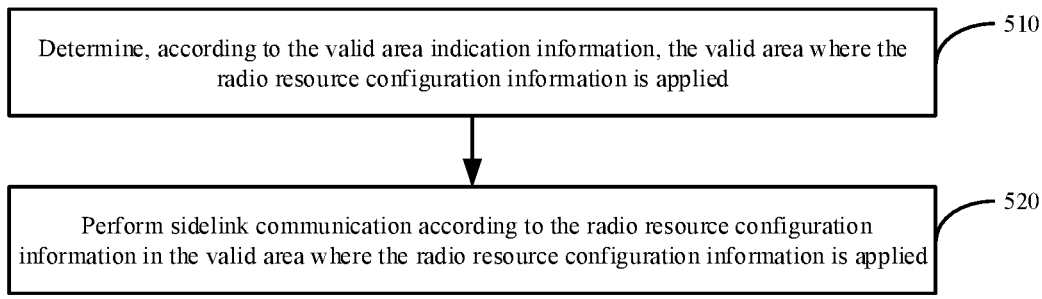
FIG. 5 is a flowchart illustrating another resource configuration method according to an example.

FIG. 5 is a flowchart illustrating another resource configuration method according to an example. The resource configuration method may be applied to a terminal and is on the basis of the method shown in FIG. 4, the connection release message may further include valid area indication information and the valid area indication information is used to indicate a valid area where the radio resource configuration information is applied. When step 430 is performed, as shown in FIG. 5, the following steps 510 and 520 may be included.

At step 510, the valid area where the radio resource configuration information is applied is determined according to the valid area indication information.

In the examples of the present disclosure, since after setting radio resource configuration information used for sidelink communication for a terminal, a base station needs to configure, for the terminal, a valid area where the radio resource configuration information is applied, and notifies a terminal of a specific range of the valid area through valid area indication information, the terminal may determine directly, according to the valid area indication information, the valid area where the radio resource configuration information is applied.

In an example, the valid area indication information at step 510 may represent an actual range of the valid area in the form of a list, which includes, but is not limited to, at least one of:

(4-1) a cell identifier list which includes one or more designated cell identifiers;
(4-2) an area identifier list which includes one or more designated area identifiers; and
(4-3) a Radio Access Network (RAN) area identifier list which includes one or more designated RAN area identifiers.

A designated cell corresponding to the one or more designated cell identifiers in (4-1) above is a valid area where radio resource configuration information is applied. In other words, when a terminal moves in designated cells, it can use the same radio resource configuration information.

Each cell in a designated area corresponding to the one or more designated area identifiers in (4-2) above is a valid area where the radio resource configuration information is applied. The area identifier is introduced in New Radio (NR), that is, a new generation communication system, and is used to indicate the actual range of the corresponding area. Correspondingly, after the terminal acquires the radio resource configuration information from the connection release message, for cells identified in the same area, the radio resource configuration information is not required to be re-acquired, and the previously acquired radio resource configuration information is still valid.

Each cell in a designated RAN area corresponding to the designated RAN area identifier in (4-3) above is a valid area where radio resource configuration information is applied. The RAN area identifier is introduced in New Radio (NR), that is, a new generation communication system, and is used to indicate the actual range of the corresponding RAN area. Correspondingly, when the terminal is in the inactive state, its NR connection with the base station is interrupted, but it can also reselect a cell in the RAN area without reporting to a network. Meanwhile, when the terminal moves in the RAN area, the same radio resource configuration information can be used to transmit and/or receive a sidelink service.

In an example, determining the valid area where the radio resource configuration information is applied at step 510 may include, but is not limited to, at least one of:

(5-1) if the valid area indication information includes the cell identifier list, determining a corresponding designated cell according to the one or more designated cell identifiers, as the valid area;
(5-2) if the valid area indication information includes the area identifier list, determining a corresponding designated area according to the one or more designated area identifiers, and determining each cell in the designated area as the valid area;
(5-3) if the valid area indication information includes the RAN area identifier list, determining a corresponding designated RAN area according to the one or more designated RAN area identifiers, and determining each cell in the designated RAN area as the valid area.

At step 520, sidelink communication is performed according to the radio resource configuration information in the valid area where the radio resource configuration information is applied.

In the examples of the present disclosure, when a terminal moves in a valid area configured by a base station, a sidelink service may be performed according to the radio resource configuration information. Performing the sidelink service may be transmitting and/or receiving the sidelink service.

In an example, when step 520 is performed, following process may be included, but is not limited to the following process.

(6-1) transmitting and/or receiving a sidelink service in the valid area according to the radio resource configuration information.

It can be seen from the above examples that when a connection release message further includes valid area indication information and the valid area indication information is used to indicate a valid area where the radio resource configuration information is applied, the valid area where the radio resource configuration information is applied may be determined according to the valid area indication information, and sidelink communication is performed according to the radio resource configuration information in the valid area where the radio resource configuration information is applied, thereby improving the accuracy and efficiency of sidelink communication.

Corresponding to the examples of the resource configuration methods, the present disclosure also provides examples of resource configuration apparatus.

Figure 6:
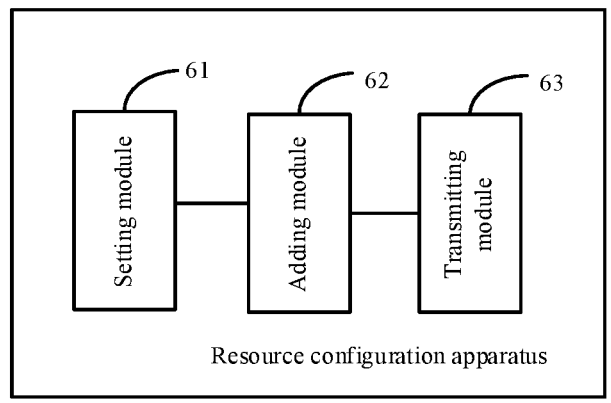
FIG. 6 is a block diagram illustrating a resource configuration apparatus according to an example.

FIG. 6 is a block diagram illustrating a resource configuration apparatus according to an example, the resource configuration apparatus may be applied to a base station and used to perform the resource configuration method as shown in FIG. 1. As shown in FIG. 6, the resource configuration apparatus may include:

a setting module 61, configured to set radio resource configuration information used for sidelink communication for a terminal;

an adding module 62, configured to, when determining that it is required to transmit a connection release message to the terminal, add the radio resource configuration information to the connection release message; and a transmitting module 63, configured to transmit the connection release message to the terminal, so that the terminal acquires the radio resource configuration information from the connection release message and performs sidelink communication according to the radio resource configuration information.

It can be seen from the above examples that radio resource configuration information used for sidelink communication may be set for a terminal. When it is determined that a connection release message needs to be transmitted to the terminal, the radio resource configuration information is added to the connection release message, and the connection release message is transmitted to the terminal. Thus, the terminal may acquire the radio resource configuration information from the connection release message, and perform sidelink communication according to the radio resource configuration information. In this way, the situation that the terminal fails to obtain required sidelink radio resource through system information in an inactive state is avoided, and the reliability of the sidelink communication of the terminal in an idle state and the inactive state is improved.

In an example, on the basis of the apparatus shown in FIG. 6, the radio resource configuration information includes first configuration information and/or second configuration information, the first configuration information is used to represent configuration information corresponding to a transmitting resource pool configured by the base station for the terminal, and the second configuration information is used to represent configuration information corresponding to a receiving resource pool configured by the base station for the terminal. In an example, the first configuration information includes a first time range and/or a first frequency range of the transmitting resource pool; and the second configuration information includes a second time range and/or a second frequency range of the receiving resource pool.

In an example, on the basis of the apparatus shown in FIG. 6, the radio resource configuration information includes third configuration information, and the third configuration information is used to represent configuration information shared by a transmitting resource pool and a receiving resource pool configured by the base station for the terminal. In an example, the third configuration information includes a third time range and/or a third frequency range shared by the transmitting resource pool and the receiving resource pool.

Figure 7:
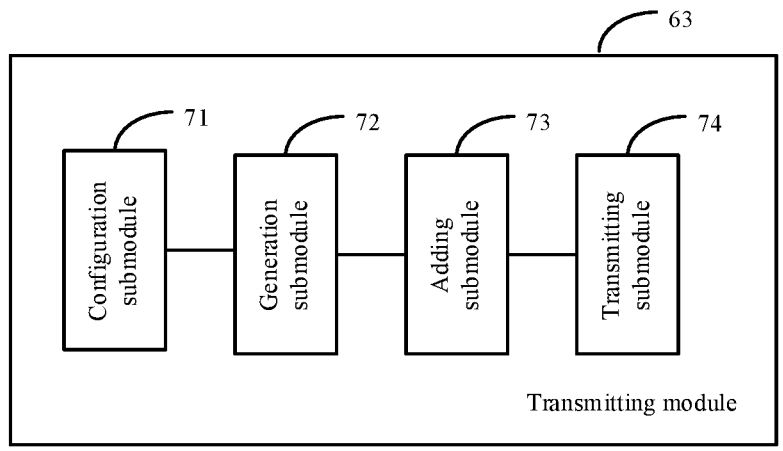
FIG. 7 is a block diagram illustrating another resource configuration apparatus according to an example.

In an example, on the basis of the apparatus shown in FIG. 6, shown in FIG. 7, the transmitting module 63 includes:

a configuration submodule 71, configured to configure, for the terminal, a valid area where the radio resource configuration information is applied;

a generation submodule 72, configured to generate valid area indication information for indicating the valid area;

an adding submodule 73, configured to add the valid area indication information to the connection release message; and a transmitting submodule 74, configured to transmit the connection release message to the terminal, so that the terminal acquires the radio resource configuration information from the connection release message, and determines, according to the valid area indication information in the connection release message, the valid area where the radio resource configuration information is applied.

It can be seen from the above examples that a valid area where radio resource configuration information is applied may be configured for a terminal, valid area indication information may be generated, the valid area indication information is added to a connection release message, and the connection release message is transmitted to the terminal. In this way, the terminal may acquire the radio resource configuration information from the connection release message, and determine, according to the valid area indication information in the connection release message, the valid area where the radio resource configuration information is applied, thereby improving the accuracy and efficiency of sidelink communication.

In an example, on the basis of the apparatus shown in FIG. 7, the valid area indication information includes at least one of:

a cell identifier list which includes one or more designated cell identifiers;

an area identifier list which includes one or more designated area identifiers; and a Radio Access Network (RAN) area identifier list which includes one or more designated RAN area identifiers.

In an example, on the basis of the apparatus shown in FIG. 6, the connection release message includes a RRC connection release message.

Figure 8:
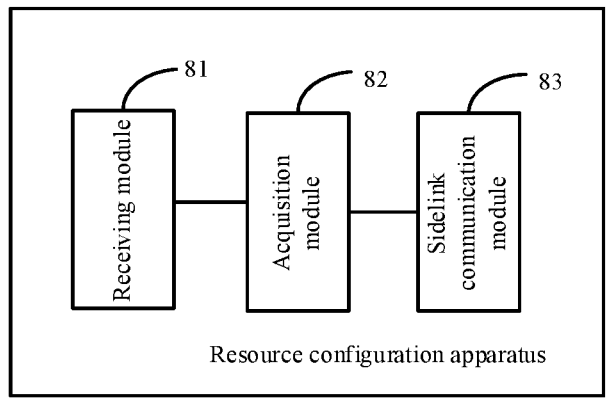
FIG. 8 is a block diagram illustrating a resource configuration apparatus according to an example.

FIG. 8 is a block diagram illustrating a resource configuration apparatus according to an example, the apparatus may be applied to a terminal and used to perform the resource configuration method as shown in FIG. 4. As shown in FIG. 8, the resource configuration apparatus may include:

a receiving module 81, configured to receive a connection release message transmitted by a base station, where the connection release message includes radio resource configuration information used for sidelink communication set by the base station for the terminal;

an acquisition module 82, configured to acquire the radio resource configuration information from the connection release message; and a sidelink communication module 83, configured to perform sidelink communication according to the radio resource configuration information.

It can be seen from the above examples that a connection release message transmitted by a base station is received, where the connection release message includes radio resource configuration information used for sidelink communication set by the base station for a terminal. The radio resource configuration information used for sidelink communication is acquired from the connection release message and sidelink communication is performed according to the radio resource configuration information. In this way, the situation that the terminal fails to obtain required sidelink radio resource through system information in an inactive state is avoided, and the reliability of the sidelink communication of the terminal in an idle state and the inactive state is improved.

In an example, on the basis of the apparatus shown in FIG. 8, the radio resource configuration information includes first configuration information and/or second configuration information, the first configuration information is used to represent configuration information corresponding to a transmitting resource pool configured by the base station for the terminal, and the second configuration information is used to represent configuration information corresponding to a receiving resource pool configured by the base station for the terminal.

Figure 9:
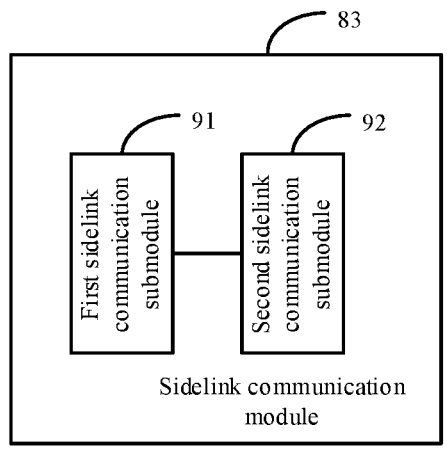
FIG. 9 is a block diagram illustrating another resource configuration apparatus according to an example.

In an example, on the basis of the apparatus shown in FIG. 8, the first configuration information in the above examples includes a first time range and/or a first frequency range of the transmitting resource pool; and the second configuration information includes a second time range and/or a second frequency range of the receiving resource pool; as shown in FIG. 9, the sidelink communication module 83 may include:

a first sidelink communication submodule 91, configured to transmit a sidelink service in the first time range and/or the first frequency range; and/or a second sidelink communication submodule 92, configured to receive a sidelink service in the second time range and/or the second frequency range.

In an example, on the basis of the apparatus shown in FIG. 8, the radio resource configuration information includes third configuration information, and the third configuration information is used to represent configuration information shared by a transmitting resource pool and a receiving resource pool configured by the base station for the terminal.

Figure 10:
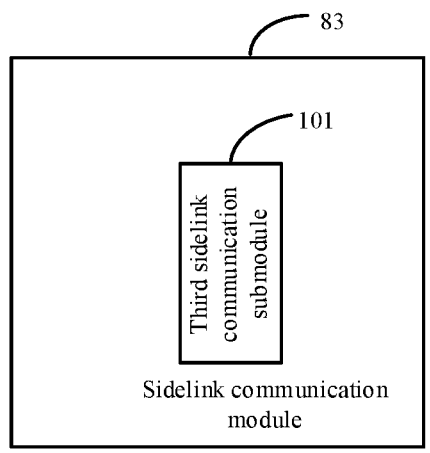
FIG. 10 is a block diagram illustrating another resource configuration apparatus according to an example.

In an example, on the basis of the apparatus shown in FIG. 8, the third configuration information in the above examples includes a third time range and/or a third frequency range shared by the transmitting resource pool and the receiving resource pool; as shown in FIG. 10, the sidelink communication module 83 may include:

a third sidelink communication submodule 101, configured to transmit and/or receive a sidelink service in the third time range and/or the third frequency range.

Figure 11:
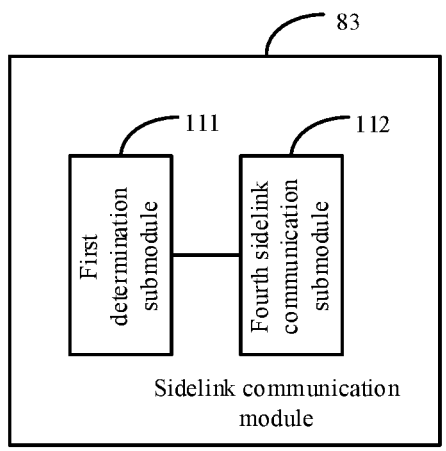
FIG. 11 is a block diagram illustrating another resource configuration apparatus according to an example.

In an example, on the basis of the apparatus shown in FIG. 8, the connection release message further includes valid area indication information, and the valid area indication information is used to indicate a valid area where the radio resource configuration information is applied; as shown in FIG. 11, the sidelink communication module 83 may include:

a first determination submodule 111, configured to determine, according to the valid area indication information, the valid area where the radio resource configuration information is applied; and a fourth sidelink communication submodule 112, configured to perform sidelink communication in the valid area according to the radio resource configuration information.

It can be seen from the above examples that when a connection release message further includes valid area indication information and the valid area indication information is used to indicate a valid area where the radio resource configuration information is applied, the valid area where the radio resource configuration information is applied may be determined according to the valid area indication information, and sidelink communication is performed according to the radio resource configuration information in the valid area where the radio resource configuration information is applied, thereby improving the accuracy and efficiency of sidelink communication.

Figure 12:
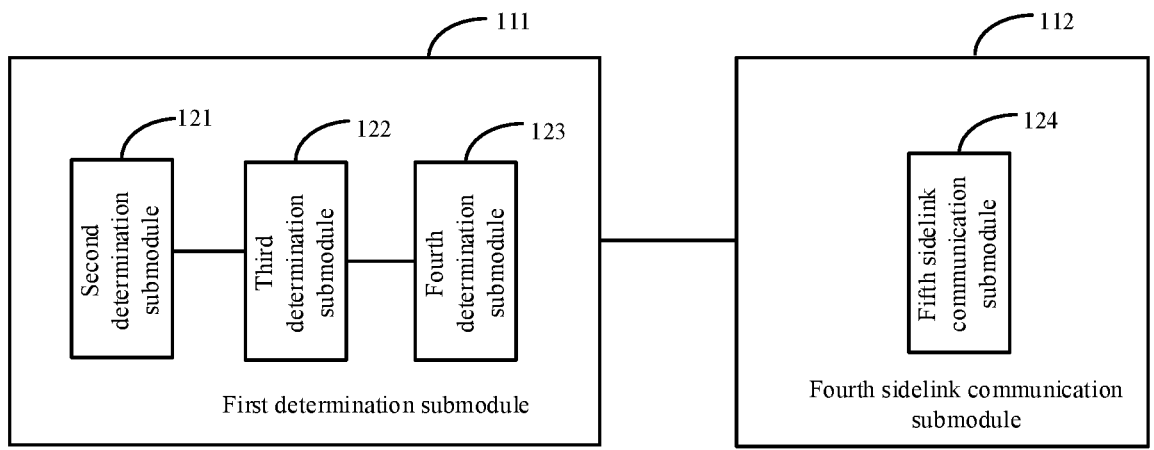
FIG. 12 is a block diagram illustrating another resource configuration apparatus according to an example.

In an example, on the basis of the apparatus shown in FIG. 11, the valid area indication information includes at least one of: a cell identifier list which includes one or more designated cell identifiers; an area identifier list which includes one or more designated area identifiers; and a Radio Access Network (RAN) area identifier list which includes one or more designated RAN area identifiers; shown in FIG. 12, the first determination submodule 111 may include:

a second determination submodule 121, configured to, in response to that the valid area indication information includes the cell identifier list, determine a corresponding designated cell according to the one or more designated cell identifiers, as the valid area;

a third determination submodule 122, configured to, in response to that the valid area indication information includes the area identifier list, determine a corresponding designated area according to the one or more designated area identifiers, and determine each cell in the designated area as the valid area;

a fourth determination submodule 123, configured to, in response to that the valid area indication information includes the RAN area identifier list, determine a corresponding designated RAN area according to the one or more designated RAN area identifiers, and determine each cell in the designated RAN area as the valid area;

the fourth sidelink communication submodule 112 may include:

a fifth sidelink communication submodule 124, configured to transmit and/or receive a sidelink service in the valid area according to the radio resource configuration information.

For the apparatus embodiment, since the apparatus substantially corresponds to the method embodiment, reference may be made to some description of the method embodiment. The apparatus embodiments described above are merely schematic, in which the units described as separate components may or may not be physically separated, and the components displayed as units may or may not be physical units, may be located in one place, or may be distributed to a plurality of network units. Some or all of the modules may be selected according to actual needs to achieve the solution of the present disclosure, which a person of ordinary skill in the art would understand and implement without creative efforts.

The present disclosure provides a non-transitory computer readable storage medium storing computer programs, where the computer programs are used to perform the resource configuration method according to any of FIG. 1 to FIG. 3.

The present disclosure provides a non-transitory computer readable storage medium storing computer programs, where the computer programs are used to perform the resource configuration method according to any of FIG. 4 to FIG. 5.

The present disclosure provides a resource configuration apparatus applied to a base station, including:
a processor; and
a memory storing instructions executable by the processor,
where the processor is configured to:
set radio resource configuration information used for sidelink communication for a terminal;
when determining that it is required to transmit a connection release message to the terminal, add the radio resource configuration information to the connection release message; and
transmit the connection release message to the terminal, so that the terminal acquires the radio resource configuration information from the connection release message and performs sidelink communication according to the radio resource configuration information.

Figure 13:
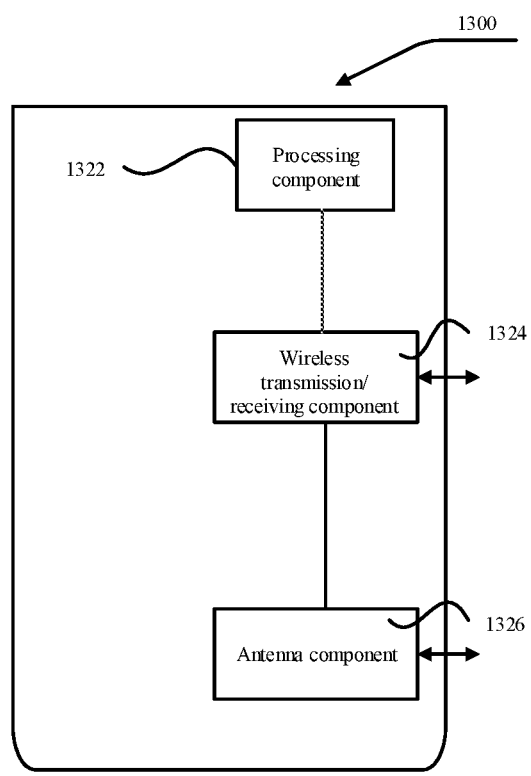
FIG. 13 is a schematic structural diagram illustrating a resource configuration apparatus according to an example.

As shown in FIG. 13, FIG. 13 FIG. 13 is a schematic structural diagram illustrating a resource configuration apparatus according to an example. The apparatus 1300 may be provided as a base station. As shown in FIG. 13, the apparatus 1300 includes a processing component 1322, a wireless transmitting/receiving component 1324, an antenna component 1326 and a signal processing portion specific to a wireless interface. The processing component 1322 may further include one or more processors.

One of the processors in the processing component 1322 may be configured to perform any of the above resource configuration methods.

The present disclosure further provides a resource configuration apparatus applied to a terminal, including:
a processor; and
a memory storing instructions executable by the processor,
where the processor is configured to:
set radio resource configuration information used for sidelink communication for a terminal;
when determining that it is required to transmit a connection release message to the terminal, add the radio resource configuration information to the connection release message; and
transmit the connection release message to the terminal, so that the terminal acquires the radio resource configuration information from the connection release message and performs sidelink communication according to the radio resource configuration information.

Figure 14:
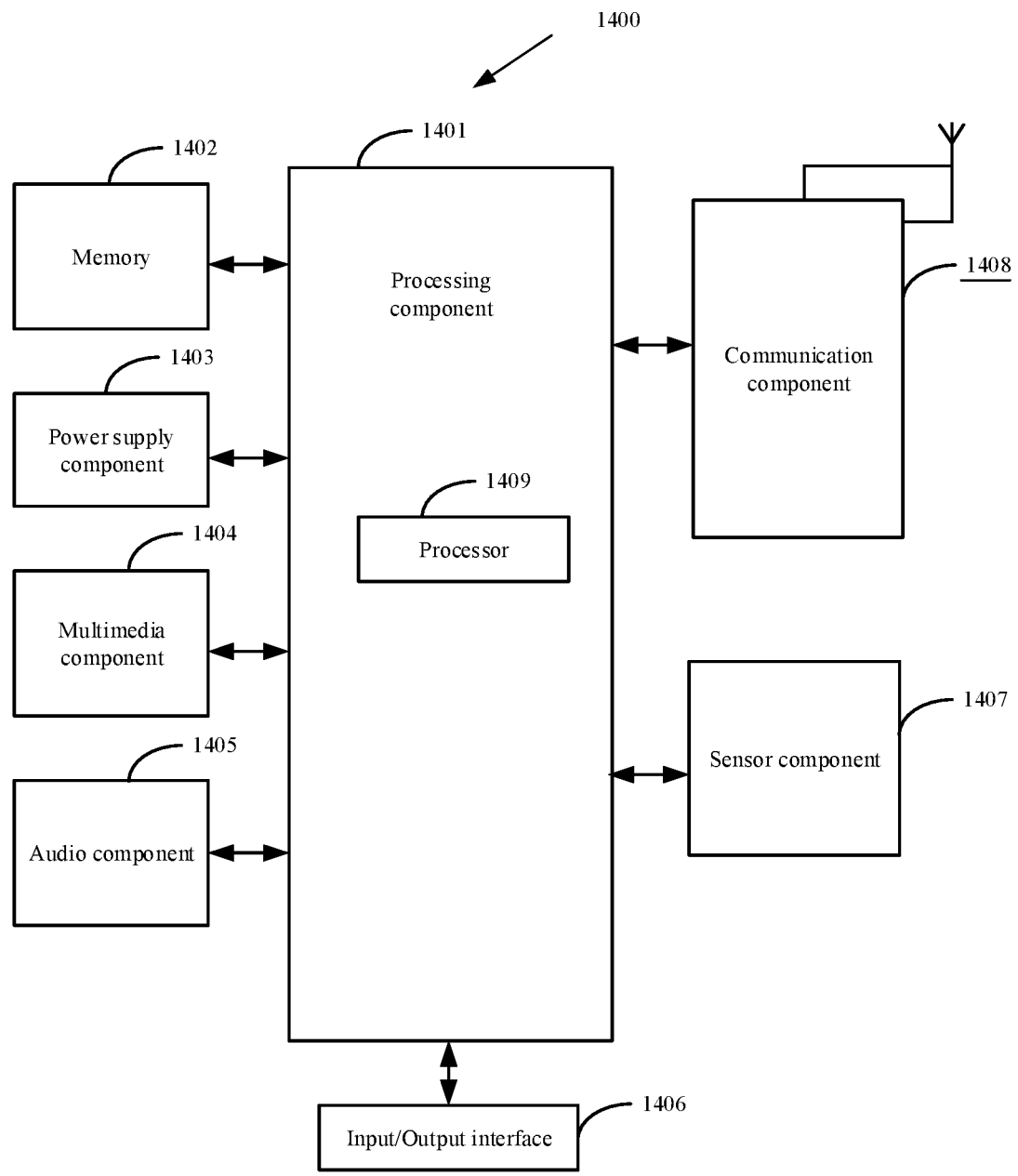
FIG. 14 is a schematic structural diagram illustrating a resource configuration apparatus according to an example.

FIG. 14 is a schematic structural diagram illustrating a resource configuration apparatus according to an example. According to an example, a resource configuration apparatus 1400 may be a terminal such as a computer, a mobile phone, a digital broadcast terminal, a message transceiving device, a game console, a tablet device, a medical equipment, a fitness equipment and a personal digital assistant.

As shown in FIG. 14, the apparatus 1400 may include one or more of the following components: a processing component 1401, a memory 1402, a power supply component 1403, a multimedia component 1404, an audio component 1405, an input/output (I/O) interface 1406, a sensor component 1407 and a communication component 1408.

The processing component 1401 generally controls overall operations of the apparatus 1400, such as operations associated with display, phone calls, data communications, camera operations, and recording operations. The processing component 1401 may include one or more processors 1420 to execute instructions so as to complete all or part of the steps of the above methods. In addition, the processing component 1401 may include one or more modules to facilitate the interaction between the processing component 1401 and other components. For example, the processing component 1401 may include a multimedia module to facilitate the interaction between the multimedia component 1404 and the processing component 1401.

The memory 1402 is configured to store various types of data to support the operation of the apparatus 1400. Examples of such data include instructions for any application or method operated on the apparatus 1400, contact data, phonebook data, messages, pictures, videos, and so on. The memory 1402 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 1403 supplies power for different components of the apparatus 1400. The power supply component 1403 may include a power supply management system, one or more power supplies, and other components associated with generating, managing and distributing power for the apparatus 1400.

The multimedia component 1404 includes a screen providing an output interface between the apparatus 1400 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1404 may include a front camera and/or a rear camera. The front camera and/or rear camera may receive external multimedia data when the apparatus 1400 is in an operating mode, such as a photographing mode or a video mode. Each of the front camera and the rear camera may be a fixed optical lens system or have focal length and optical zooming capability.

The audio component 1405 is to output and/or input an audio signal. For example, the audio component 1405 includes a microphone (MIC). When the apparatus 1400 is in an operating mode, such as a call mode, a record mode and a voice recognition mode, the microphone is to receive an external audio signal. The received audio signal may be further stored in the memory 1402 or sent via the communication component 1408. In some examples, the audio component 1405 further includes a speaker for outputting an audio signal.

The I/O interface 1406 provides an interface between the processing component 1401 and a peripheral interface module. The above peripheral interface module may be a keyboard, a click wheel, buttons, or the like. These buttons may include but not limited to, a home button, a volume button, a start button and a lock button.

The sensor component 1407 includes one or more sensors to provide status assessments of various aspects for the apparatus 1400. For example, the sensor component 1407 may detect the on/off status of the apparatus 1400, and relative positioning of the component, for example, the component is a display and a keypad of the apparatus 1400. The sensor component 1407 may also detect a change in position of the apparatus 1400 or a component of the apparatus 1400, a presence or absence of the contact between a user and the apparatus 1400, an orientation or an acceleration/deceleration of the apparatus 1400, and a change in temperature of the apparatus 1400. The sensor component 1407 may include a proximity sensor to detect the presence of a nearby object without any physical contact. The sensor component 1407 may further include an optical sensor, such as a Complementary Metal-Oxide-Semiconductor (CMOS) or Charged Coupled Device (CCD) image sensor which is used in imaging applications. In some examples, the sensor component 1407 may further include an acceleration sensor, a gyroscope sensor, a magnetic sensor, a pressure sensor, or a temperature sensor.

The communication component 1408 is to facilitate wired or wireless communication between the apparatus 1400 and other devices. The apparatus 1400 may access a wireless network based on a communication standard, such as Wi-Fi, 2G, 3G, 4G or 5G, or a combination thereof. In an example, the communication component 1408 receives a broadcast signal or broadcast related information from an external broadcast management system via a broadcast channel. In an example, the communication component 1408 may further include a Near Field Communication (NFC) module for promoting short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the apparatus 1400 may be implemented by one or more Application Specific Integrated Circuits (ASICs), Digital Signal Processors (DSPs), Digital Signal Processing Devices (DSPDs), programmable Logic Devices (PLDs), Field Programmable Gate Arrays (FPGAs), controllers, microcontrollers, microprocessors, or other electronic components for performing the above methods.

In an example, there is further provided a non-transitory computer readable storage medium including instructions, such as the memory 1402 including instructions. The above instructions may be executed by the processor 1420 of the apparatus 1400 to complete the above method. For example, the non-transitory computer readable storage medium may be a Read-Only Memory (ROM), a Random Access Memory (RAM), a CD-ROM, a magnetic tape, a floppy disk, an optical data storage device, and the like.

The instructions in the storage medium, when executed by the processor, cause apparatus 1400 to perform any of the above resource configuration methods.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

After considering the specification and practicing the present disclosure, the persons skilled in the art may easily conceive of other implementations of the present disclosure. The present disclosure is intended to include any variations, uses and adaptive changes of the present disclosure. These variations, uses and adaptive changes follow the general principle of the present disclosure and include common knowledge or conventional technical means in the art not disclosed in the present disclosure. The specification and examples herein are intended to be illustrative only.

It is to be understood that the present disclosure is not limited to the precise structure described above and shown in the accompanying drawings, and that various modifications and changes may be made without departing from the scope thereof

The invention claimed is:

1. A resource configuration method applied to a base station, comprising:
    setting radio resource configuration information used for sidelink communication for a terminal;
    when determining that it is required to transmit a connection release message to the terminal, adding the radio resource configuration information to the connection release message; and
    transmitting the connection release message to the terminal, so that the terminal acquires the radio resource configuration information from the connection release message and performs sidelink communication according to the radio resource configuration information;
    wherein transmitting the connection release message to the terminal comprises:
        configuring, for the terminal, a valid area where the radio resource configuration information is applied;
        generating valid area indication information for indicating the valid area, wherein the valid area indication information comprises at least one of:
            a cell identifier list which comprises one or more designated cell identifiers;
            an area identifier list which comprises one or more designated area identifiers; or
            a Radio Access Network (RAN) area identifier list which comprises one or more designated RAN area identifiers;
        adding the valid area indication information to the connection release message; and
        transmitting the connection release message to the terminal, so that the terminal acquires the radio resource configuration information from the connection release message, determines, according to the valid area indication information, the valid area where the radio resource configuration information is applied, and performs sidelink communication in the valid area according to the radio resource configuration information, wherein the connection release message is configured for the terminal to perform at least one of:
            determining a corresponding designated cell as the valid area according to the one or more designated cell identifiers in the cell identifier list of the valid area indication information;
determining a corresponding designated area according to the one or more designated area identifiers in the area identifier list of the valid area indication information, and determining each cell in the designated area as the valid area; or
determining a corresponding designated RAN area according to the one or more designated RAN area identifiers in the RAN area identifier list of the valid area indication information, and determining each cell in the designated RAN area as the valid area;
wherein the connection release message is further configured for the terminal to perform at least one of:
transmitting a sidelink service in the valid area according to the radio resource configuration information; or
receiving a sidelink service in the valid area according to the radio resource configuration information.

2. The method according to claim 1, wherein the radio resource configuration information comprises at least one of first configuration information or second configuration information,
the first configuration information is used to represent configuration information corresponding to a transmitting resource pool configured by the base station for the terminal, and
the second configuration information is used to represent configuration information corresponding to a receiving resource pool configured by the base station for the terminal.

3. The method according to claim 2, wherein the first configuration information comprises at least one of a first time range of the transmitting resource pool or a first frequency range of the transmitting resource pool; and
the second configuration information comprises at least one of a second time range of the receiving resource pool or a second frequency range of the receiving resource pool.

4. The method according to claim 1, wherein the radio resource configuration information comprises third configuration information, and
the third configuration information is used to represent configuration information shared by a transmitting resource pool and a receiving resource pool configured by the base station for the terminal.

5. The method according to claim 4, wherein the third configuration information comprises at least one of a third time range or a third frequency range shared by the transmitting resource pool and the receiving resource pool.

6. The method according to claim 1, wherein the connection release message comprises a radio resource control (RRC) connection release message.

7. A resource configuration method applied to a terminal, comprising:
receiving a connection release message transmitted by a base station, wherein the connection release message comprises radio resource configuration information used for sidelink communication set by the base station for the terminal;
acquiring the radio resource configuration information from the connection release message; and
performing sidelink communication according to the radio resource configuration information;
wherein the connection release message further comprises valid area indication information, and the valid area indication information is used to indicate a valid area where the radio resource configuration information is applied;
performing sidelink communication according to the radio resource configuration information comprises:
determining, according to the valid area indication information, the valid area where the radio resource configuration information is applied; and
performing sidelink communication in the valid area according to the radio resource configuration information;
wherein the valid area indication information comprises at least one of:
a cell identifier list which comprises one or more designated cell identifiers;
an area identifier list which comprises one or more designated area identifiers; or
a Radio Access Network (RAN) area identifier list which comprises one or more designated RAN area identifiers;
determining, according to the valid area indication information, the valid area where the radio resource configuration information is applied, comprises at least one of:
determining a corresponding designated cell as the valid area according to the one or more designated cell identifiers in the cell identifier list of the valid area indication information;
determining a corresponding designated area according to the one or more designated area identifiers in the area identifier list of the valid area indication information, and determining each cell in the designated area as the valid area; or
determining a corresponding designated RAN area according to the one or more designated RAN area identifiers in the RAN area identifier list of the valid area indication information, and determining each cell in the designated RAN area as the valid area;
performing sidelink communication in the valid area according to the radio resource configuration information comprises at least one of:
transmitting a sidelink service in the valid area according to the radio resource configuration information; or
receiving a sidelink service in the valid area according to the radio resource configuration information.

8. The method according to claim 7, wherein the radio resource configuration information comprises at least one of first configuration information or second configuration information,
the first configuration information is used to represent configuration information corresponding to a transmitting resource pool configured by the base station for the terminal, and
the second configuration information is used to represent configuration information corresponding to a receiving resource pool configured by the base station for the terminal.

9. The method according to claim 8, wherein the first configuration information comprises at least one of a first time range of the transmitting resource pool or a first frequency range of the transmitting resource pool; and the second configuration information comprises at least one of a second time range of the receiving resource pool or a second frequency range of the receiving resource pool;

performing sidelink communication according to the radio resource configuration information comprises at least one of:
  transmitting a sidelink service in at least one of the first time range or the first frequency range; or
  receiving a sidelink service in at least one of the second time range or the second frequency range.

10. The method according to claim 7, wherein the radio resource configuration information comprises third configuration information, and
  the third configuration information is used to represent configuration information shared by a transmitting resource pool and a receiving resource pool configured by the base station for the terminal.

11. The method according to claim 10, wherein the third configuration information comprises at least one of a third time range or a third frequency range shared by the transmitting resource pool and the receiving resource pool; and
  performing sidelink communication according to the radio resource configuration information comprises at least one of:
    transmitting a sidelink service in at least one of the third time range or the third frequency range, or
    receiving a sidelink service in at least one of the third time range or the third frequency range.

12. A non-transitory computer readable storage medium storing computer programs, wherein the computer programs are used to perform the resource configuration method according to claim 1.

13. A non-transitory computer readable storage medium storing computer programs, wherein the computer programs are used to perform the resource configuration method according to claim 7.

14. A resource configuration apparatus applied to a base station, comprising:
  a processor; and
  a memory storing instructions executable by the processor,
  wherein the processor is configured to:
    set radio resource configuration information used for sidelink communication for a terminal;
    when determining that it is required to transmit a connection release message to the terminal, add the radio resource configuration information to the connection release message; and
    transmit the connection release message to the terminal, so that the terminal acquires the radio resource configuration information from the connection release message and performs sidelink communication according to the radio resource configuration information;
  wherein when transmitting the connection release message to the terminal, the processor is configured to:
    configure, for the terminal, a valid area where the radio resource configuration information is applied;
    generate valid area indication information for indicating the valid area, wherein the valid area indication information comprises at least one of:
      a cell identifier list which comprises one or more designated cell identifiers;
      an area identifier list which comprises one or more designated area identifiers; or
      a Radio Access Network (RAN) area identifier list which comprises one or more designated RAN area identifiers;
    add the valid area indication information to the connection release message; and
    transmit the connection release message to the terminal, so that the terminal acquires the radio resource configuration information from the connection release message, determines, according to the valid area indication information, the valid area where the radio resource configuration information is applied, and performs sidelink communication in the valid area according to the radio resource configuration information, wherein the connection release message is configured for the terminal to perform at least one of:
      determining a corresponding designated cell as the valid area according to the one or more designated cell identifiers in the cell identifier list of the valid area indication information;
      determining a corresponding designated area according to the one or more designated area identifiers in the area identifier list of the valid area indication information, and determining each cell in the designated area as the valid area; or
      determining a corresponding designated RAN area according to the one or more designated RAN area identifiers in the RAN area identifier list of the valid area indication information, and determining each cell in the designated RAN area as the valid area;
    wherein the connection release message is further configured for the terminal to perform at least one of:
      transmitting a sidelink service in the valid area according to the radio resource configuration information; or
      receiving a sidelink service in the valid area according to the radio resource configuration information.

15. A resource configuration apparatus applied to a terminal, comprising:
  a processor; and
  a memory storing instructions executable by the processor,
  wherein the processor is configured to perform the resource configuration method according to claim 7.

* * * * *